US011973753B2

(12) United States Patent
Henry

(10) Patent No.: US 11,973,753 B2
(45) Date of Patent: Apr. 30, 2024

(54) SYSTEMS AND METHODS FOR CLIENT-SIDE IDENTITY VERIFICATION

(71) Applicant: Meta Platforms, Inc., Menlo Park, CA (US)

(72) Inventor: Colleen Kelly Henry, Oakland, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 408 days.

(21) Appl. No.: 17/349,474

(22) Filed: Jun. 16, 2021

(65) Prior Publication Data

US 2022/0407853 A1 Dec. 22, 2022

(51) Int. Cl.
| | |
|---|---|
| H04L 29/00 | (2006.01) |
| G06F 18/22 | (2023.01) |
| G06N 5/04 | (2023.01) |
| G06N 20/00 | (2019.01) |
| G06V 30/40 | (2022.01) |
| G06V 40/16 | (2022.01) |
| G06V 40/40 | (2022.01) |
| H04L 9/40 | (2022.01) |

(52) U.S. Cl.
CPC .......... *H04L 63/0861* (2013.01); *G06F 18/22* (2023.01); *G06N 5/04* (2013.01); *G06N 20/00* (2019.01); *G06V 30/40* (2022.01); *G06V 40/172* (2022.01); *G06V 40/45* (2022.01)

(58) Field of Classification Search
CPC ... H04L 63/1433; H04L 41/22; H04L 63/102; H04L 63/1425; H04L 63/20; H04L 63/1458
See application file for complete search history.

(56) References Cited

U.S. PATENT DOCUMENTS

| | | | | |
|---|---|---|---|---|
| 9,172,699 | B1* | 10/2015 | Vazquez | H04L 63/0861 |
| 10,699,493 | B2* | 6/2020 | Hausman | H04L 9/3239 |
| 10,984,458 | B1* | 4/2021 | Gutierrez | G06V 40/168 |
| 11,072,311 | B2* | 7/2021 | Luchner | G06V 40/168 |
| 11,080,384 | B2* | 8/2021 | Ganong | G06F 21/32 |
| 11,100,503 | B2* | 8/2021 | Iyer | H04L 9/321 |
| 11,134,105 | B2* | 9/2021 | Park | H04L 63/20 |
| 11,140,158 | B1* | 10/2021 | Adam | H04L 63/102 |

(Continued)

OTHER PUBLICATIONS

International Search Report and Written Opinion for International Application No. PCT/US2022/030427, dated Sep. 8, 2022, 9 pages.

*Primary Examiner* — Don G Zhao
(74) *Attorney, Agent, or Firm* — Greenberg Traurig, LLP

(57) ABSTRACT

A computer-implemented method for client-side identity verification may include (1) receiving, via an endpoint computing device, input from a user that includes biometric data of the user captured by a sensor of the endpoint computing device and visual data of a physical identification document that includes a record of the biometric data, (2) verifying, by the endpoint computing device, that the biometric data captured by the sensor of the endpoint computing device matches the record of the biometric data in the physical identification document, and (3) transmitting, to a server, a verification that the user has been identified while preventing the biometric data from being included in the verification sent to the server. Various other methods, systems, and computer-readable media are also disclosed.

20 Claims, 6 Drawing Sheets

(56) References Cited

U.S. PATENT DOCUMENTS

| | | | |
|---|---|---|---|
| 2005/0067487 A1* | 3/2005 | Brundage | G07F 7/12 235/380 |
| 2009/0214116 A1* | 8/2009 | Hirohata | G06V 10/757 382/190 |
| 2010/0158326 A1* | 6/2010 | Takeda | G07D 7/2033 382/119 |
| 2013/0219463 A1* | 8/2013 | Sambamurthy | G06F 21/31 726/1 |
| 2014/0279516 A1 | 9/2014 | Rellas et al. | |
| 2015/0341370 A1* | 11/2015 | Khan | H04L 63/20 726/30 |
| 2016/0241531 A1* | 8/2016 | Loughlin-McHugh | H04L 63/08 |
| 2016/0248765 A1* | 8/2016 | Saxena | H04L 9/3231 |
| 2018/0307814 A1* | 10/2018 | Renard | G06F 21/64 |
| 2020/0019682 A1 | 1/2020 | Lee et al. | |
| 2020/0042685 A1 | 2/2020 | Tussy et al. | |
| 2020/0195436 A1* | 6/2020 | Khan | H04L 9/0637 |
| 2020/0195694 A1* | 6/2020 | Kalinin | G06Q 10/107 |
| 2020/0344059 A1* | 10/2020 | Bahloul | H04L 9/3239 |
| 2020/0366671 A1* | 11/2020 | Larson | H04L 9/3228 |
| 2021/0075788 A1* | 3/2021 | Pasterk | G06F 16/532 |
| 2021/0124919 A1* | 4/2021 | Balakrishnan | G06V 30/416 |
| 2021/0351927 A1* | 11/2021 | Gal | G06F 21/6245 |
| 2022/0210144 A1* | 6/2022 | Wagner | G06F 21/35 |

\* cited by examiner

SYSTEMS AND METHODS FOR CLIENT-SIDE IDENTITY VERIFICATION

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
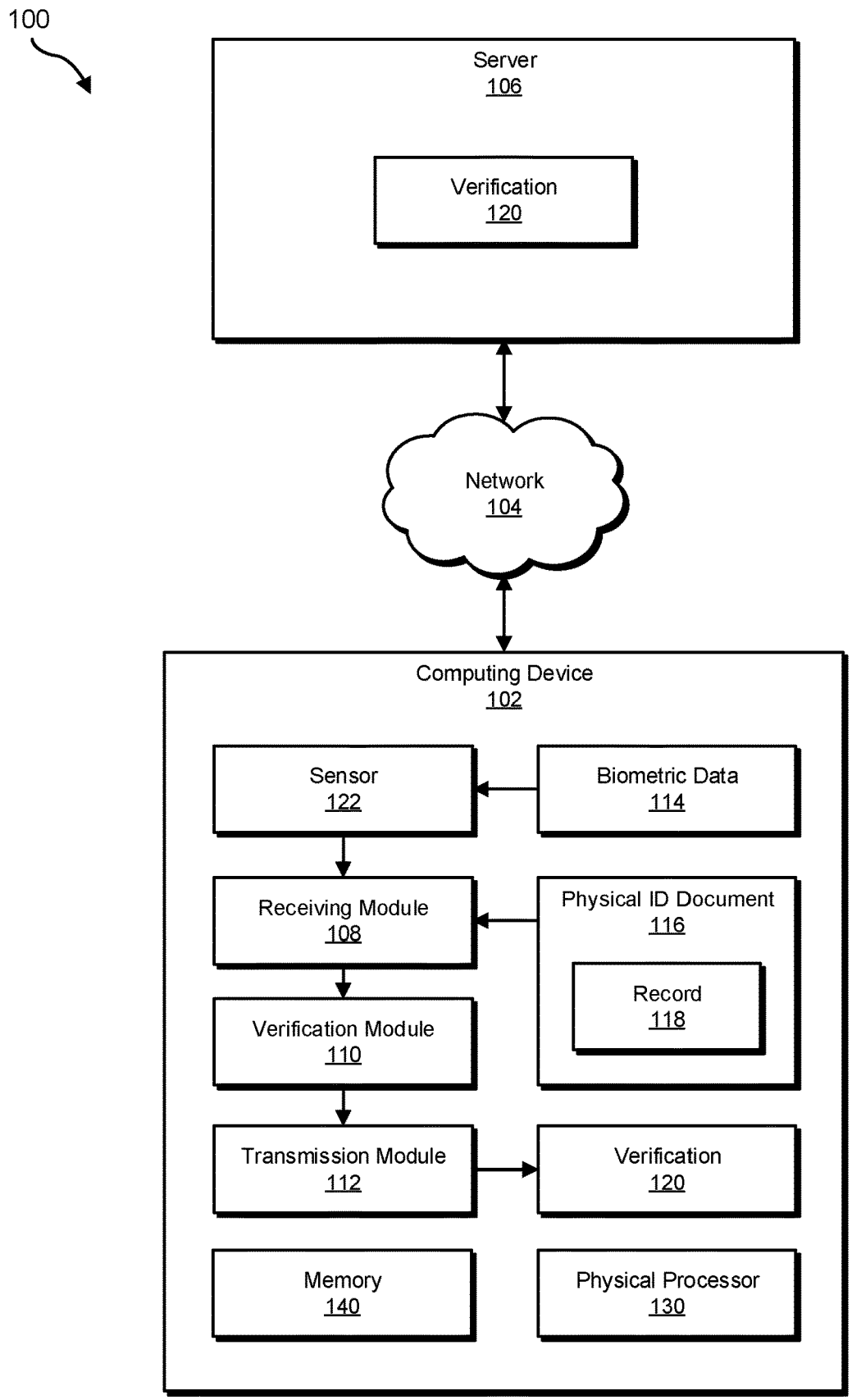
FIG. 1 is a block diagram of an exemplary system for client-side identity verification.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

Features from any of the embodiments described herein may be used in combination with one another in accordance with the general principles described herein. These and other embodiments, features, and advantages will be more fully understood upon reading the following detailed description in conjunction with the accompanying drawings and claims.

DETAILED DESCRIPTION OF EXEMPLARY EMBODIMENTS

The present disclosure is generally directed to systems and methods for enabling a user to uniquely and accurately identify themself to a platform without transmitting sensitive data from the client to a server. In some cases, a platform (e.g., a social networking platform, a gaming platform, etc.) may be configured to only allow a single account for each individual user. In other cases, a platform may require a user to verify that they are a unique individual for other reasons. The systems described herein may protect user privacy by enabling a user to provide such a verification to a platform without transmitting personally identifying information, such as biometric data, the user's name, etc., from the user's device to a server hosting the platform. Instead, the systems described herein may perform identity verification steps entirely on the user's device and then transmit a confirmation that the user's identity has been verified. In one embodiment, the systems described herein may prompt a user to initiate recording of one or more images and/or videos of the user's face in addition to one or more images and/or videos of the user's physical identification (e.g., driver's license, passport, etc.). In some embodiments, the systems described herein may include sensors that verify that the user is a person (e.g., temperature sensors, pulse sensors, etc.) to avoid being circumvented by realistic pictures or mannequins. In one embodiment, the systems described herein may use a machine learning algorithm to match the images and/or videos of the user with the images and/or videos of the user's physical identification. In some embodiments, the systems described herein may transmit obfuscated information (e.g., a hash) to a server to confirm that the user has a verified identity. In some examples, a verified identity may be associated with a single user account for a platform.

In some embodiments, the systems described herein may improve the functioning of a computing device by enabling an endpoint computing device to verify a user's identity without sending personally identifying information to a server. In some embodiments, the systems described herein may improve user privacy, reduce network usage, and/or improve the speed (e.g., processing time) of identity verification systems by performing entirely client-side identity verification. Additionally, the systems described herein may improve the fields of identity management, regulatory compliance, and/or user privacy by producing unique verifications of user identity that do not include personally identifying information about the user.

In some embodiments, the systems described herein may perform client-side identity verification on an endpoint computing device, such as a user's personal computing device. FIG. 1 is a block diagram of an exemplary system 100 for client-side identity verification. In one embodiment, and as will be described in greater detail below, a computing device 102 may be configured with a receiving module 108 that receives input from a user that includes biometric data 114 of the user captured by a sensor 122 and visual data of a physical identification (ID) document 116 that includes a record of the biometric data. Example system 100 may additionally include a verification module 110 that verifies that biometric data 114 captured by sensor 122 matches the record of the biometric data in physical ID document 116. Example system 100 may also include a transmission module 112 that transmits, to a server 106 (e.g., via a network 104), a verification 120 that the user has been identified while preventing the biometric data 114 from being included in verification 120 sent to server 106. Although illustrated as separate elements, one or more modules in FIG. 1 may represent portions of a single module or application.

Computing device 102 generally represents any type or form of computing device capable of reading computer-executable instructions. For example, computing device 102 may represent an endpoint computing device, such as a personal computing device operated by a user. Examples of computing device 102 may include, without limitation, a laptop, a desktop, a mobile phone, a wearable device, a smart device, an artificial reality device, a personal digital assistant (PDA), etc.

Biometric data 114 generally represents any physical or behavioral human characteristic. In some examples, biometric data 114 may include visual data of the user and/or audio data of the user. In one example, biometric data 114 may include a scan of part of a user's body. Examples of biometric data 114 may include, without limitation, images and/or video of the user's face and/or body, audio of the user's voice, an iris scan of the user, a fingerprint of the user, a handprint of the user, a footprint of the user, and/or multiples thereof.

Physical ID document 116 may generally represent any type or form of document that has a physical (as opposed to purely digital) form and that identifies an individual. In some examples, physical ID document 116 may be an official government-issued form of identification, such as a driver's license or passport. Additionally or alternatively, physical ID document 116 may be a non-government-issued form of identification that can be authenticated by the issuer, such as an employee ID card or library card. Physical ID document 116 may include various types of records of biometric data. For example, physical ID document 116 may include a picture of the user's face and/or body. In another example, physical ID document 116 may include an image of the user's fingerprint. In one embodiment, physical ID document 116 may include an audio storage component that stores recorded audio of the user's voice.

Verification 120 may generally represent any message containing content that verifies that a user has been identified. In some embodiments, verification 120 may be and/or include a verification token. For example, verification 120 may include a hash that functions as a verification token. In one embodiment, verification 120 may include a unique hash that is generated based at least in part on the biometric data. In some embodiments, the systems described herein may generate the hash based at least in part on additional data about the user, such as the user's name and/or information known to the user (e.g., a password or passphrase). Additionally or alternatively, verification 120 may include a hash that is unrelated to the biometric data and/or the user. In some embodiments, due to being a hash, it may not be possible for devices to which verification 120 is transmitted to reverse engineer verification 120 to obtain personally identifying information about the user. In some embodiments, verification 120 may be encrypted using any of a variety of encryption techniques. In some embodiments, the systems described herein may generate different schemas of combinations of biometrics, passwords, pins, patterns, etc., for verification token 120 during different sessions.

Server 106 generally represents any type or form of backend computing device that may receive a verification of a user's identity and/or host a platform that includes user accounts. Examples of server 106 may include, without limitation, application servers, database servers, and/or any other relevant type of server. Although illustrated as a single entity in FIG. 1, server 106 may include and/or represent a group of multiple servers that operate in conjunction with one another.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more the modules illustrated in FIG. 1. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more modules stored in memory 140. Additionally or alternatively, physical processor 130 may execute one or more modules. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor. In some embodiments, example system 100 may include a trusted hardware module, such as a trusted platform module and/or smart card. In some examples, the systems described herein may use the trusted hardware module in combination with another authentication factor (e.g., biometric data, a passphrase known to the user, etc.) to perform identity verification and/or secure user data.

Figure 2:
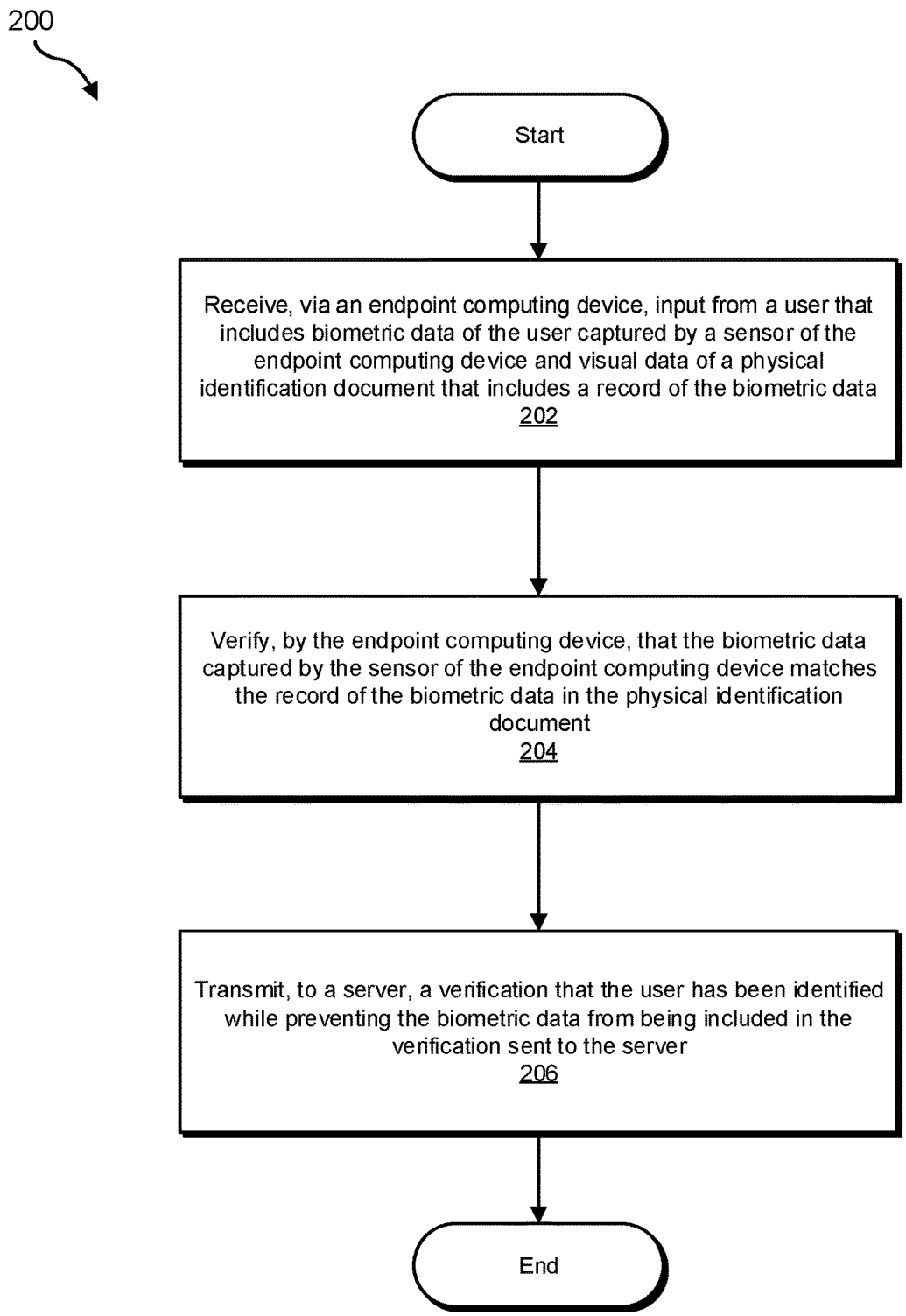
FIG. 2 is a flow diagram of an exemplary method for client-side identity verification.

FIG. 2 is a flow diagram of an exemplary method 200 for client-side identity verification. In some examples, at step 202, one or more of the systems described herein may receive, via an endpoint computing device, input from a user that may include biometric data of the user captured by a sensor of the endpoint computing device and visual data of a physical ID document that includes a record of the biometric data. For example, receiving module 108 may, as part of computing device 102 in FIG. 1, receive, via computing device 102, input from a user that may include biometric data 114 of the user captured by sensor 122 and visual data of physical ID document 116.

Receiving module 108 may receive the data in a variety of ways and/or contexts. In some examples, the systems described herein may receive data in response to prompting a user to provide identity verification data. For example, the user may attempt to register for a platform (e.g., a social networking platform) that requires each account to be linked to a unique individual. In this example, the systems described herein may prompt the user to provide identity verification data in order to send a verification to the platform that the user has been uniquely identified and enable the user to create an account for the platform.

In some embodiments, the systems described herein may provide a user with instructions for inputting the data. For example, the systems described herein may show a series of dialogues, prompts, and/or other user interface elements with instructions for the user on how to input the biometric data and/or the visual data of the physical ID document. In some examples, the systems described herein may show a user example biometric data. For example, the systems described herein may show a user images of a person's face taken at different angles in order to aid the user in taking pictures of their face at the correct angles. In another example, the systems described herein may play a short video of how to input the data.

In some embodiments, the systems described herein may receive the biometric data and the visual data of the physical ID document via the same sensor and/or in the same format. For example, the biometric data may include pictures of the user's face captured at different angles by a camera of the endpoint computing device and/or the visual data of the physical ID document may include pictures of the physical ID document captured at different angles by the same camera. In another example, the biometric and visual data may both include video captured by the same camera. Additionally or alternatively, the systems described herein may receive the data via different sensors. For the example, the systems described herein may receive the biometric data via a fingerprint scanner and may use a camera to capture an image of a physical ID document that includes a picture of the user's fingerprint. In some embodiments, the sensors that collect photonic information may capture information beyond the human visual spectrum such as ultraviolent and/or infrared. In some embodiments, the systems described herein may include multiple sensors that detect characteristics at the same time, such as the conductivity, opacity, and/or shape (e.g., placement and/or height of fingerprint ridges) of a finger.

At step 204, one or more of the systems described herein may verify, by the endpoint computing device, that the biometric data captured by the sensor of the endpoint computing device matches the record of the biometric data in the physical identification document. For example, verification module 110 may, as part of computing device 102 in FIG. 1, verify that biometric data 114 captured by sensor 122 matches the record of the biometric data in physical ID document 116.

Verification module 110 may verify that the biometric data matches the record of the biometric data in a variety of ways. In some embodiments, verification module 110 may pre-process, format, and/or normalize the data. For example, if the biometric data includes a picture of the user captured by a camera of the mobile device and the record of the biometric data includes a picture of the user on a driver's license, the systems described herein may process one or both pieces of data such that each picture is the same size, color mode, and/or format.

In some examples, the systems described herein may determine that the biometric data matches the record of the biometric data if both records are identical. For example, the systems described herein may determine that a scan of a fingerprint matches a picture of a fingerprint if the fingerprints are identical. In other examples, the systems described herein may determine that the biometric data matches the record of the biometric data if both items of data identify the same individual, even if the data is not itself identical. For example, the systems described herein may determine that a several-years-old picture of a user on a driver's license matches a current image of the user captured by a webcam even if the user does not appear identical in both images and/or different items are visible in the background of each image. Similarly, the systems described herein may determine that a video of a user matches an image of the user if both items of data clearly identify the same user (e.g., based on facial features and/or other physical identity metrics), even though the items of data are different types of media.

In some embodiments, the systems described herein may use a machine learning model and/or algorithm to match the biometric data and the record of the biometric data. For example, the systems described herein may use a machine learning model trained to match images and/or videos of people in order to determine whether a video of the user captured by a camera of the user's mobile device matches a picture of the user on the user's passport.

In one embodiment, the systems described herein may verify that the physical ID document is on a predetermined list of approved physical ID document types. For example, the systems described herein may require that a physical ID document be a driver's license or passport. In other embodiments, the systems described herein may have a more flexible list of physical ID document types. The systems described herein may detect various features of the document, such as the format, a serial number, and/or one or more embedded document security features (e.g., holograms, etc.) that identify the type of physical ID document. By verifying that the physical ID document is of a predetermined approved document type, the systems described herein may avoid being circumvented by homemade ID documents that do not correspond to the user's actual identity.

At step 206, one or more of the systems described herein may transmit, to a server, a verification that the user has been identified while preventing the biometric data from being included in the verification sent to the server. For example, transmission module 112 may, as part of computing device 102 in FIG. 1, transmit, to server 106, a verification 120 that the user has been identified while preventing biometric data 114 from being included in verification 120 sent to server 106. In some embodiments, the systems described herein may prevent biometric data 114 from being sent from computing device 102 to any other device. For example, transmission module 112 may be configured to not transmit biometric data 114 and/or any other personally identifying information about a user. In one example, the systems described herein may avoid storing and/or may delete biometric data 114 and/or other relevant personally identifying information after creating and/or transmitting verification 120, preventing that data from later being accessed by other applications and/or unauthorized users of computing device 102.

Transmission module 112 may send the verification in a variety of ways and/or contexts. For example, the systems described herein may prompt a user to verify their identity in response to a request for identity verification from a platform. In this example, transmission module 112 may transmit the verification to the platform as soon as the systems described herein verify the user's identity. In another example, the user may preemptively complete the verification process and the systems described herein may store the verification (e.g., in the form of a verification token) until the verification is requested by a platform.

Figure 3:
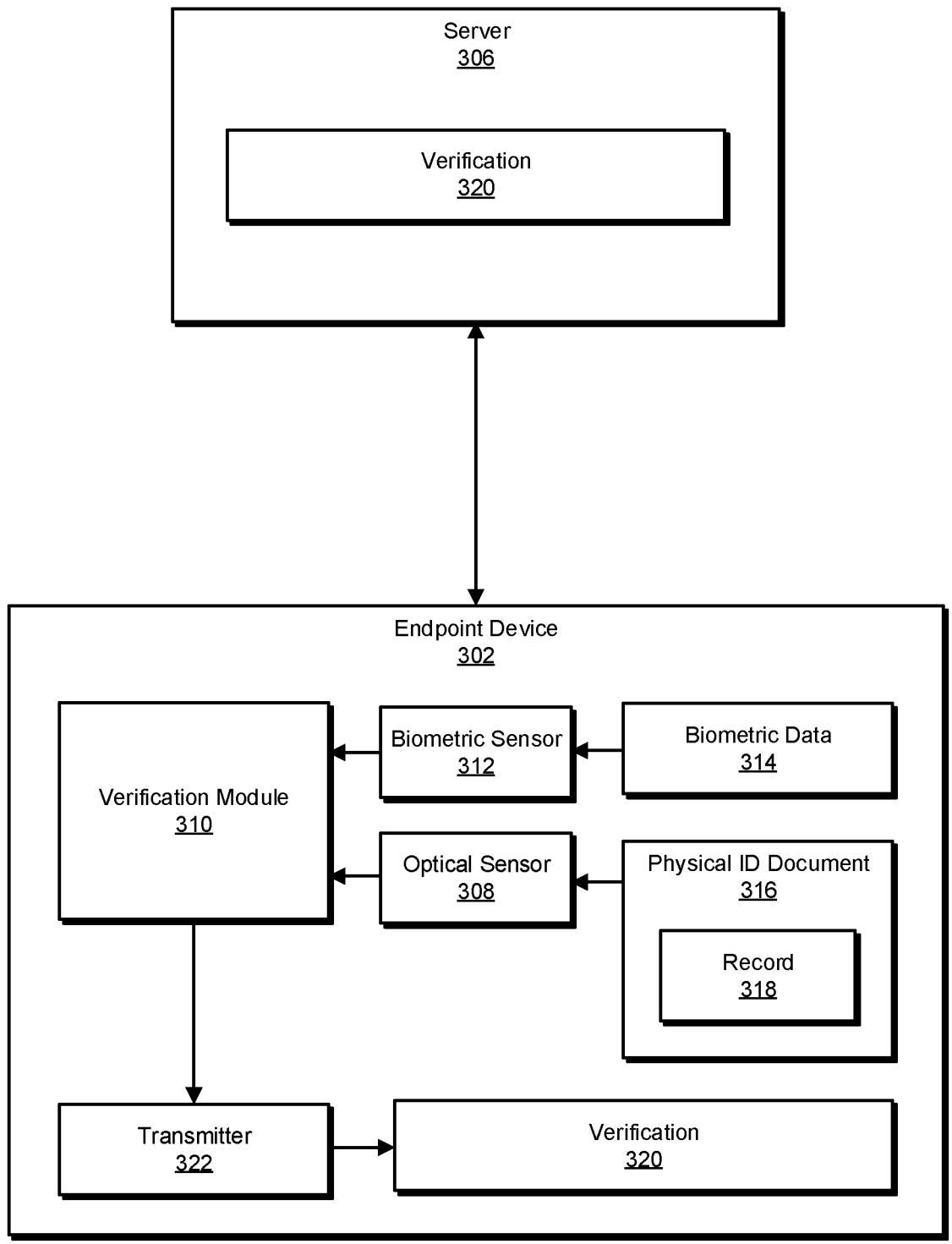
FIG. 3 is a block diagram of an exemplary system for client-side identity verification.

In some embodiments, the systems described herein may perform client-side identity verification using multiple sensors of an endpoint device. For example, as illustrated in FIG. 3, an endpoint device 302 may be configured with a verification module 310 that receives biometric data 314 from a biometric sensor 312 and/or an optical sensor 308 that receives visual data of a physical ID document 316 that includes a record 318 of biometric data. In some embodiments verification module 310 may send a confirmation to a transmitter 322 (e.g., a wireless network transmitter, local area network transmitter, near-field communication transmitter, etc.) that record 318 matches biometric data 314, prompting transmitter 322 to send a verification 320 to an additional device and/or platform, such as server 306.

Figure 4:
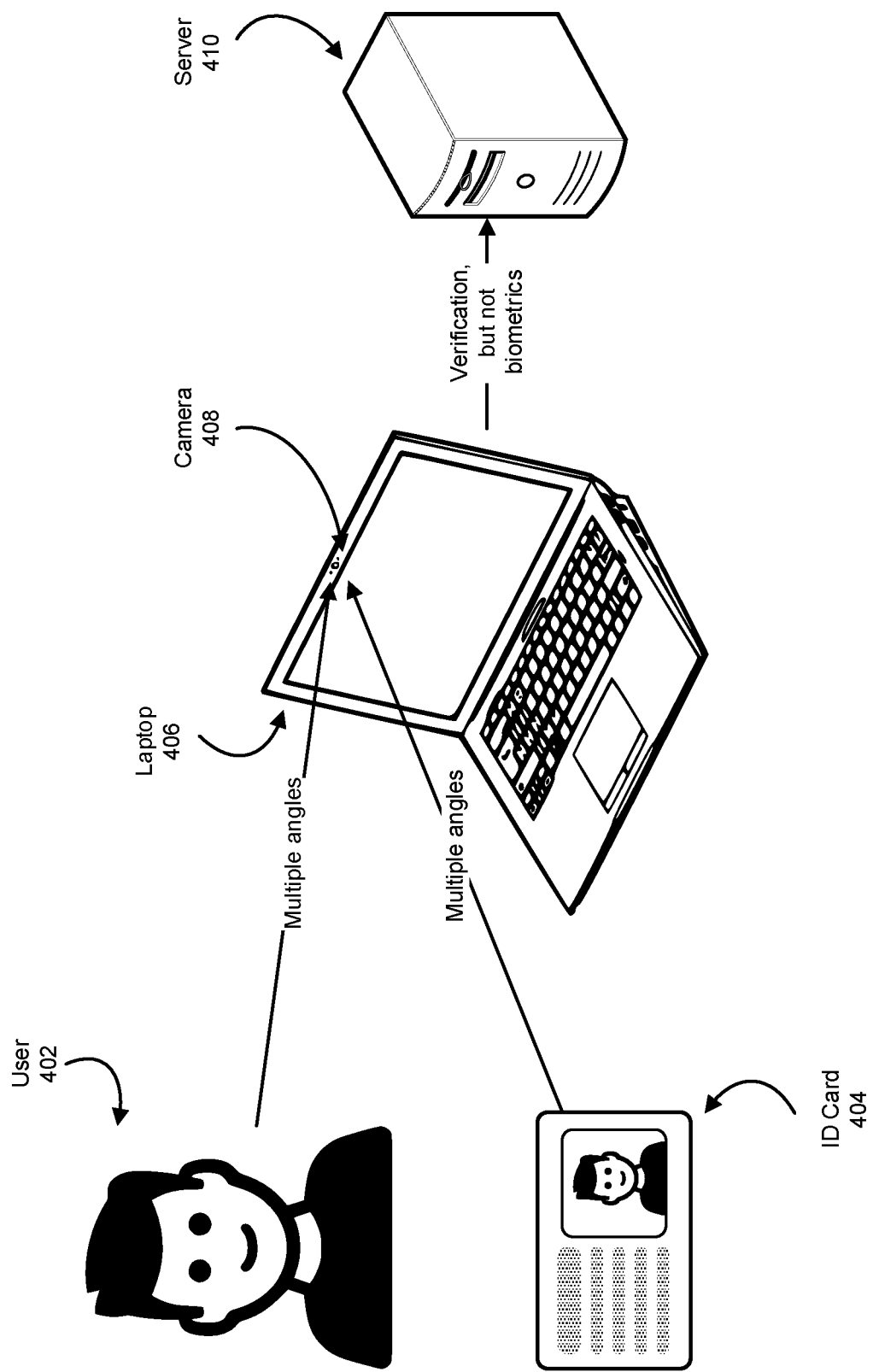
FIG. 4 is an illustration of an exemplary system for client-side identity verification.

In some embodiments, the systems described herein may prompt a user to take pictures of themselves and/or their physical ID document from multiple angles in order to ensure that the user is the person they claim to be (as opposed to someone holding a picture of someone else up to a camera) and/or is in possession of the physical ID (as opposed to a picture of the physical ID). For example, as illustrated in FIG. 4, a laptop 406 may be configured with the systems described herein and may prompt a user 402 to pose in front of a camera 408 at multiple angles (e.g., full face, side profile, partial profile). The systems described herein may also prompt the user to hold up an ID card 404 in front of camera 408 at multiple angles (e.g., parallel to camera 408, at a 45° angle horizontally, at a 45° angle vertically).

In some examples, the systems described herein may compare the images of user 402 with the images of ID card 404 to determine whether ID card 404 identifies user 402. If the systems described herein match the newly taken pictures of user 402 with the picture of user 402 on ID card 404, the systems described herein may send a verification to a server 410. However, the systems described herein may not send the images of user 402, the images of ID card 404, or any other personal information about user 402 (e.g., name, demographic information, etc.) to server 410 or any other device.

Figure 5:
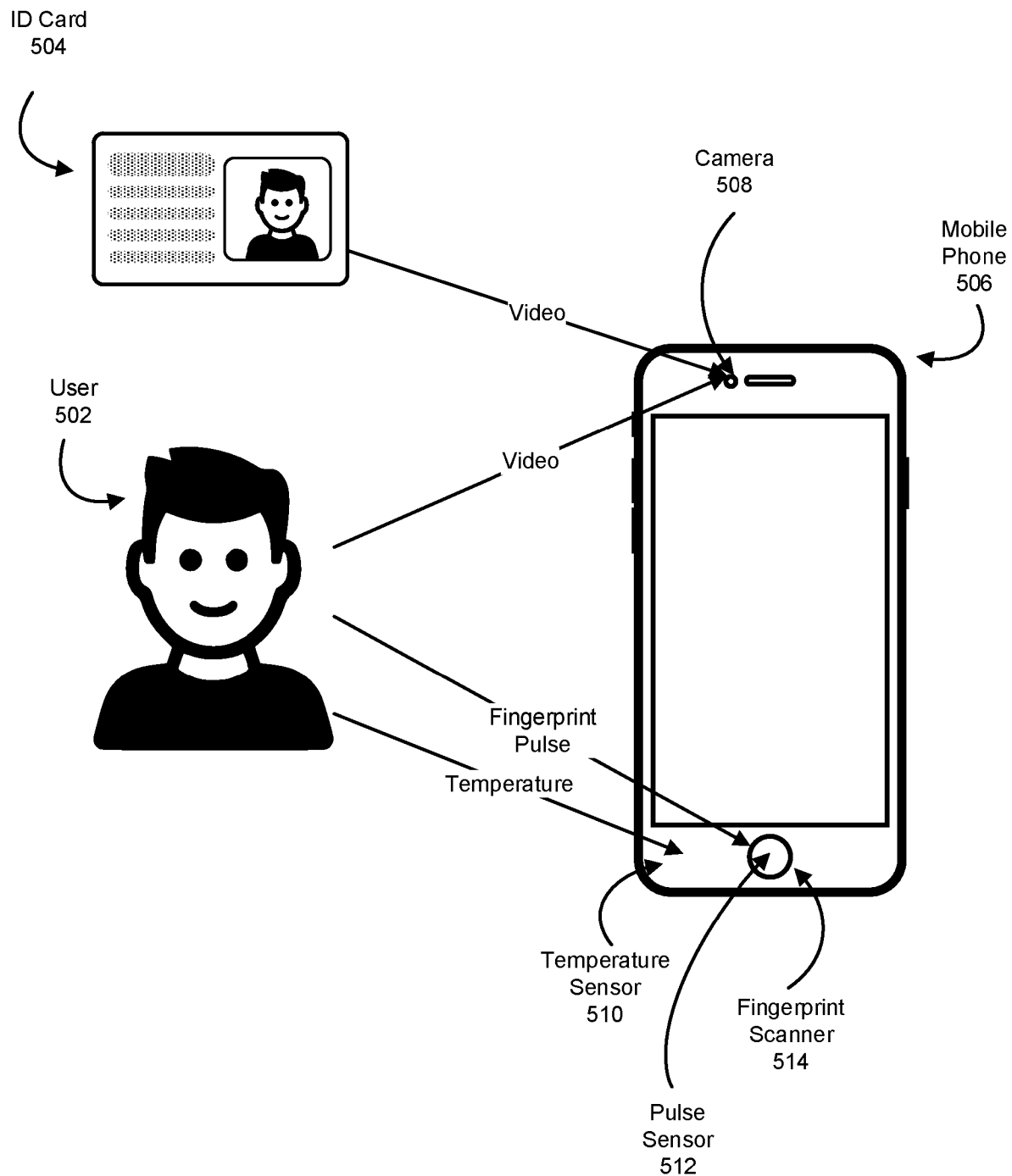
FIG. 5 is an illustration of an exemplary system for client-side identity verification that incorporates multiple types of sensors.

In some embodiments, the systems described herein may include multiple sensors that detect at least one type of biometric data that is produced by a living human body but not by an artificial representation of a human. For example, as illustrated in FIG. 5, a mobile phone 506 may have a camera 508, temperature sensor 510, pulse sensor 512, and/or fingerprint scanner 514. In one example, camera 508 may take video of a user 502 and/or an ID card 504. In order to avoid being circumvented by an image or a realistic mannequin of a person, the systems described herein may prompt user 502 to touch fingerprint scanner 514. The systems described herein may then take the user's temperature via temperature sensor 510, scan the user's fingerprint via fingerprint scanner 514, and/or detect the user's pulse via pulse sensor 512, verifying that user 502 is an actual human and not a mannequin.

In some embodiments, the systems described herein may be configured to operate with different sensors and/or combinations of sensors based on the sensors available on a given endpoint device. For example, if an endpoint device does not have a pulse sensor, the systems described herein may rely only on a temperature sensor. If an endpoint device has no relevant sensors, the systems described herein may require additional actions from the user, such as taking images and/or video in various poses that would be difficult for a mannequin to assume.

Figure 6:
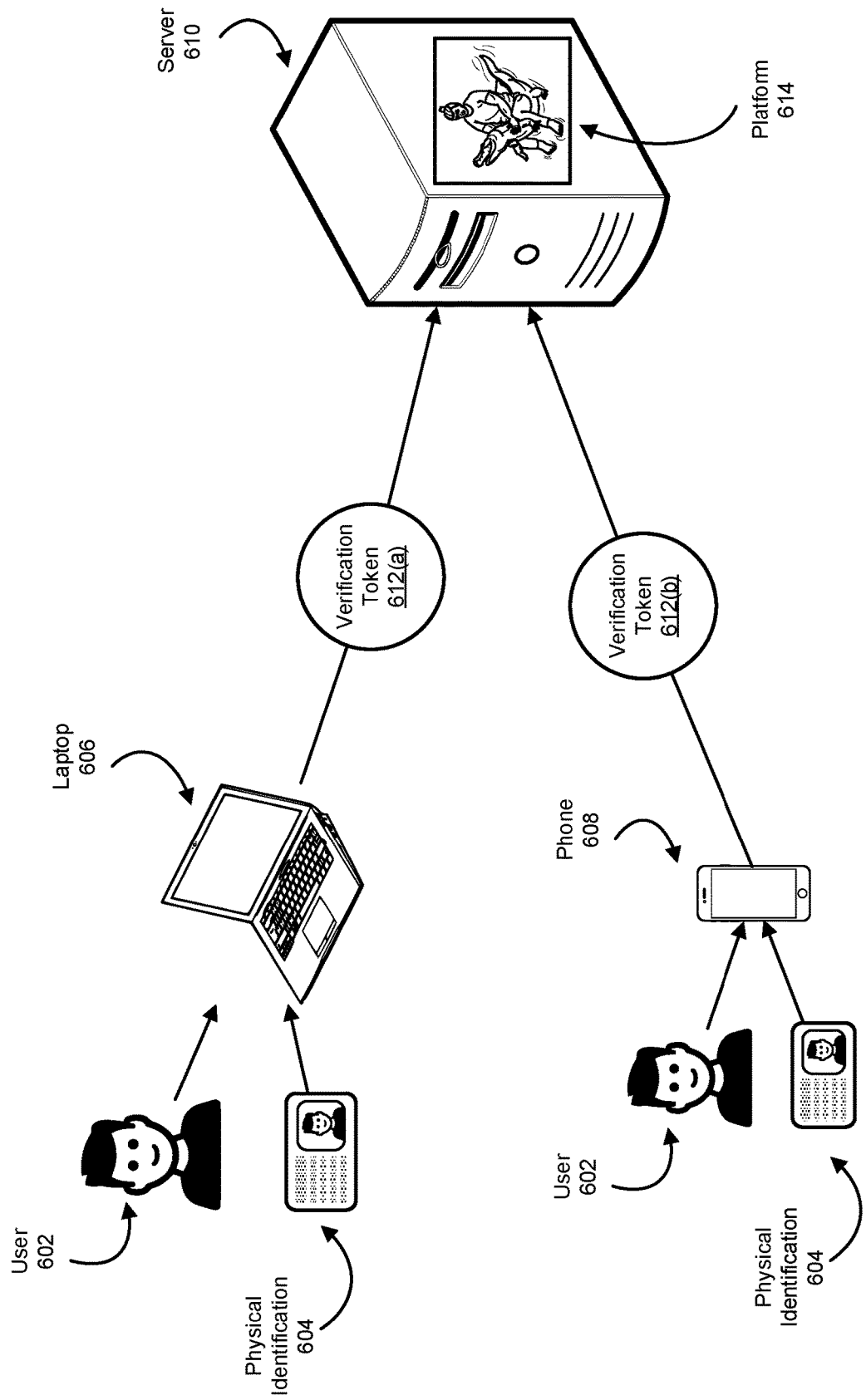
FIG. 6 is an illustration of an exemplary system for client-side identity verification across multiple devices.

In some embodiments, the systems described herein may enable platforms to prevent a user from registering multiple accounts on the same platform. Additionally or alternatively, in some embodiments, the systems described herein may enable a user to authenticate to a platform on multiple devices via a verification token. For example, as illustrated in FIG. 6, a laptop 606 configured with the systems described herein may verify the identity of a user 602 based on biometric data of user 602 and visual data of a physical ID 604. In one embodiment, the systems described herein may generate, based at least in part on biometric data of user 602 and/or visual data of physical ID 604, a verification token 612(*a*). In some examples, the systems described herein may transmit verification token 612(*a*) to a server 610 that hosts a platform 614, such as a social media platform, a media streaming platform, and/or a gaming platform. In one example, platform 614 may host a competitive alligator wrestling game for which each individual user is only permitted to create a single user account.

In one example, user 602 may attempt to circumvent anti-cheating measures in a popular alligator wrestling game by creating a second account on platform 614 via a phone 608 that is configured with the systems described herein. In one embodiment, the systems described herein may generate, based at least in part on biometric data of user 602 and/or visual data of physical ID 604, a verification token 612(*b*) that matches and/or is identical to verification token 612(*a*) generated by laptop 606. Because verification token 612(*b*) represents the same unique individual as verification token 612(*a*), platform 614 may recognize user 602 on phone 608 as the owner of the account created via laptop 606 and may not allow user 602 to create an additional account. In some examples, platform 614 may authenticate the user to the original account in response to receiving verification token 612(*b*).

As described above, the systems and methods described herein may enable a user to verify to a platform that the user is a unique individual without requiring the user to transmit personally identifiable information to the platform. The systems described herein may enable platforms to enforce one-account-per-unique-individual policies without linking the account to any identifying information about the user, such as images and/or the legal name of the user. This may enable such platforms to relax requirements on the data that must be provided by users (e.g., ending policies that require accounts to be associated with legal names), easing the burden of regulatory compliance for the platforms (e.g., in regards to storing personally identifying information) and vastly increasing privacy for users, who may now create accounts without providing personally identifying information. In addition, by verifying the user's identity entirely on the client side, the systems described herein may reduce the risk of users' personal information being misused, mishandled, or lost by platforms by preventing platforms from possessing the personal information to begin with.

Example Embodiments

Example 1: A method for client-side identity verification may include (i) receiving, via an endpoint computing device, input from a user that includes (a) biometric data of the user captured by a sensor of the endpoint computing device and (b) visual data of a physical identification document that includes a record of the biometric data, (ii) verifying, by the endpoint computing device, that the biometric data captured by the sensor of the endpoint computing device matches the record of the biometric data in the physical identification document, and (iii) transmitting, to a server, a verification that the user has been identified while preventing the biometric data from being included in the verification sent to the server.

Example 2: The computer-implemented method of example 1, where the biometric data of the user captured by the sensor includes a group of images of the user, where each image is captured at a different angle from each other image.

Example 3: The computer-implemented method of examples 1-2, where the biometric data of the user captured by the sensor includes video of the user.

Example 4: The computer-implemented method of examples 1-3, where the record of the biometric data includes an image of the user.

Example 5: The computer-implemented method of examples 1-4, where the visual data of the physical identification document includes a plurality of images of the physical identification document, where each image is captured at a different angle from each other image and/or video of the physical identification document.

Example 6: The computer-implemented method of examples 1-5, where receiving the input from the user that includes the physical identification document includes verifying that the physical identification document is on a predetermined list of approved physical identification document types.

Example 7: The computer-implemented method of examples 1-6, where receiving the input from the user includes capturing, via an additional sensor of the endpoint computing device, at least one type of biometric data that is produced by a living human body but not by an artificial representation of a human.

Example 8: The computer-implemented method of examples 1-7, where the additional sensor includes at least one of a temperature sensor or a pulse sensor.

Example 9: The computer-implemented method of examples 1-8, where verifying that the biometric data captured by the sensor of the endpoint computing device matches the record of the biometric data in the physical identification document includes matching the biometric data via a machine learning algorithm.

Example 10: The computer-implemented method of examples 1-9 may further include authenticating, on the endpoint device, the user to a user account on a platform by sending the verification from the endpoint device to the platform.

Example 11: The computer-implemented method of examples 1-10 may further include authenticating the user to the user account on the platform on an additional endpoint device by sending the verification from the additional endpoint device to the platform.

Example 12: The computer-implemented method of examples 1-11, where the verification includes a unique hash generated based on the biometric data that cannot be used to obtain the biometric data.

Example 13: A system for client-side identity verification may include (i) a biometric sensor that captures biometric data of a user, (ii) an optical sensor that captures visual data of a physical identification document that includes a record of the biometric data, (iii) a verification module that verifies that the biometric data captured by the biometric sensor matches the record of the biometric data in the physical identification document, and (iv) a transmitter that transmits, to a server, a verification that the user has been identified while preventing the biometric data from being included in the verification sent to the server.

Example 14: The system of example 13, where the biometric sensor includes a camera and the biometric data of the user captured by the biometric sensor includes a plurality of images of the user, where each image is captured at a different angle from each other image.

Example 15: The system of examples 13-14, where the biometric sensor includes a video camera and the biometric data of the user captured by the biometric sensor includes video of the user.

Example 16: The system of examples 13-15, where the record of the biometric data includes an image of the user.

Example 17: The system of examples 13-16, where the visual data of the physical identification document includes at least one of a plurality of images of the physical identification document (where each image is captured at a different angle from each other image) or video of the physical identification document.

Example 18: The system of examples 13-17 may further include an additional sensor that captures at least one type of biometric data that is produced by a living human body but not by an artificial representation of a human.

Example 19: The system of examples 13-18, where the additional sensor includes at least one of a temperature sensor or a pulse sensor.

Example 20: A system for client-side identity verification may include at least one physical processor and physical memory including computer-executable instructions that, when executed by the physical processor, cause the physical processor to (i) receive, via an endpoint computing device, input from a user that includes (a) biometric data of the user captured by a sensor of the endpoint computing device and (b) visual data of a physical identification document that includes a record of the biometric data, (ii) verify, by the endpoint computing device, that the biometric data captured by the sensor of the endpoint computing device matches the record of the biometric data in the physical identification document, and (iii) transmit, to a server, a verification that the user has been identified while preventing the biometric data from being included in the verification sent to the server.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive image data to be transformed, transform the image data into a data structure that stores user characteristic data, output a result of the transformation to select a customized interactive ice breaker widget relevant to the user, use the result of the transformation to present the widget to the user, and store the result of the transformation to create a record of the presented widget. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving, via an endpoint computing device that is operated by a user, input from the user that comprises:
     biometric data of the user captured by a sensor of the endpoint computing device; and
     visual data of a physical identification document that comprises a record of the biometric data;
   generating, by the endpoint computing device, a verification token in response to verifying, by the endpoint computing device, that the biometric data captured by the sensor of the endpoint computing device matches the record of the biometric data in the physical identification document; and
   in response to generating the verification token, transmitting, to a server, the verification token while refraining from transmitting the biometric data or the visual data to the server.

2. The computer-implemented method of claim 1, wherein the biometric data of the user captured by the sensor comprises a plurality of images of the user, wherein each image of the user is captured at a different angle from each other image of the user.

3. The computer-implemented method of claim 1, wherein the biometric data of the user captured by the sensor comprises video of the user.

4. The computer-implemented method of claim 1, wherein the record of the biometric data comprises an image of the user.

5. The computer-implemented method of claim 1, wherein the visual data of the physical identification document comprises at least one of:
   a plurality of images of the physical identification document, wherein each image of the physical identification document is captured at a different angle from each other image of the physical identification document; or
   video of the physical identification document.

6. The computer-implemented method of claim 1, further comprising verifying, in response to receiving the input from the user that comprises the visual data of the physical identification document, that the physical identification document is on a predetermined list of approved physical identification document types.

7. The computer-implemented method of claim 1, wherein receiving the input from the user comprises capturing, via an additional sensor of the endpoint computing device, at least one type of biometric data that is produced by a living human body but not by an artificial representation of a human.

8. The computer-implemented method of claim 7, wherein the additional sensor comprises at least one of:
   a temperature sensor; or
   a pulse sensor.

9. The computer-implemented method of claim 1, wherein verifying that the biometric data captured by the sensor of the endpoint computing device matches the record of the biometric data in the physical identification document comprises matching the biometric data via a machine learning algorithm.

10. The computer-implemented method of claim 1, further comprising authenticating, on the endpoint computing device, the user to a user account on a platform by sending the verification token from the endpoint computing device to the platform.

11. The computer-implemented method of claim 10, further comprising authenticating the user to the user account on the platform on an additional endpoint device by sending the verification token from the additional endpoint device to the platform.

12. The computer-implemented method of claim 1, wherein the verification token comprises a unique hash generated based on the biometric data that cannot be used to obtain the biometric data.

13. A system comprising:
   a biometric sensor that captures biometric data of a user;
   an optical sensor that captures visual data of a physical identification document that comprises a record of the biometric data;
   a verification module that generates a verification token in response to verifying that the biometric data captured by the biometric sensor matches the record of the biometric data in the physical identification document; and
   a transmitter that transmits, to a server and in response to the verification module generating the verification token, the verification token refraining from transmitting the biometric data or the visual data to the server.

14. The system of claim 13, wherein:
   the biometric sensor comprises a camera; and
   the biometric data of the user captured by the biometric sensor comprises a plurality of images of the user, wherein each image of the user is captured at a different angle from each other image of the user.

15. The system of claim 13, wherein:
the biometric sensor comprises a video camera; and
the biometric data of the user captured by the biometric sensor comprises video of the user.

16. The system of claim 13, wherein the record of the biometric data comprises an image of the user.

17. The system of claim 13, wherein the visual data of the physical identification document comprises at least one of:
a plurality of images of the physical identification document, wherein each image of the physical identification document is captured at a different angle from each other image of the physical identification document; or
video of the physical identification document.

18. The system of claim 13, further comprising an additional sensor that captures at least one type of biometric data that is produced by a living human body but not by an artificial representation of a human.

19. The system of claim 18, wherein the additional sensor comprises at least one of:
a temperature sensor; or
a pulse sensor.

20. A system comprising:
at least one physical processor; and
physical memory comprising computer-executable instructions that, when executed by the at least one physical processor, cause the at least one physical processor to:
receive, via an endpoint computing device that is operated by a user, input from the user that comprises:
biometric data of the user captured by a sensor of the endpoint computing device; and
visual data of a physical identification document that comprises a record of the biometric data;
generate, by the endpoint computing device, a verification token in response to verify, by the endpoint computing device, that the biometric data captured by the sensor of the endpoint computing device matches the record of the biometric data in the physical identification document; and
transmit, to a server and in response to generating the verification token, the verification token while refraining from transmitting the biometric data or the visual data to the server.

* * * * *